United States Patent [19]

Butler

[11] 4,141,932

[45] Feb. 27, 1979

[54] COMBINED EMULSION AND SUSPENSION PROCESS FOR PRODUCING GRAFT ABS BEAD-LIKE PARTICLES

[75] Inventor: James M. Butler, Parkersburg, W. Va.

[73] Assignee: Borg-Warner Corporation, Chicago, Ill.

[21] Appl. No.: 839,090

[22] Filed: Oct. 3, 1977

[51] Int. Cl.[2] .......... C08F 279/04

[52] U.S. Cl. .......... 260/880 R

[58] Field of Search .......... 260/880 R

[56] References Cited

U.S. PATENT DOCUMENTS

| | | | |
|---|---|---|---|
| 3,370,105 | 2/1968 | De Bell | 260/879 |
| 3,436,440 | 4/1968 | Abe | 260/880 R |
| 4,011,283 | 3/1977 | Sturt | 260/880 R |
| 4,017,670 | 4/1977 | Spicuzza | 260/880 R |

*Primary Examiner*—Paul R. Michl
*Attorney, Agent, or Firm*—William S. McCurry

[57] ABSTRACT

A method of preparing a graft ABS polymer comprising first preparing a rubbery graft ABS polymer by emulsion polymerizing acrylonitrile and styrene in the presence of a rubber, coagulating the emulsion and then polymerizing a mixture of acrylonitrile and styrene in the presence of the coagulant and an organic or inorganic suspending agent to form bead-like particles of ABS.

9 Claims, No Drawings

COMBINED EMULSION AND SUSPENSION PROCESS FOR PRODUCING GRAFT ABS BEAD-LIKE PARTICLES

BACKGROUND OF THE INVENTION

Graft ABS resins have become a predominant plastic in the engineering polymer field. They are made by emulsion, suspension, solution, and bulk techniques, or by a combination thereof. In 1976, over 2 billion pounds of ABS was made worldwide, a vast majority of this production being by the emulsion technique which requires induced coagulation of the polymer by the addition of inorganic salts or acids, washing, filtering and drying to produce a polymer in the form of powder.

Suspension polymerization of ABS is employed on a small scale but the product thus obtained is deficient in impact strength, thus limiting its use in many applications. Typical solution rubbers are employed in suspension ABS processes, and the amount of rubber that can be utilized is limited by its viscosity in the monomer solution. The suspension prepared ABS has the advantage, however, of being in bead form.

U.S. Pat. 3,436,440 recognizes the problem of recovering the ABS polymer from the emulsion and teaches the preparation of an ABS polymer made by suspension polymerizing acrylonitrile and styrene in the presence of a butadiene rubber in the form of an emulsion. However, it has been found that an ABS polymer made by first emulsion polymerizing acrylonitrile and styrene monomers in the presence of a butadiene rubber latex to form a high rubber graft latex; coagulating the thus formed latex; and then suspension polymerizing acrylonitrile and styrene in the presence of the coagulated emulsion results in a recoverable bead-like particle, which when fabricated, has greater impact resistance than when the monomers are suspension polymerized in the presence of the butadiene rubber emulsion, due to the fact higher rubber levels can be obtained by the present emulsion-suspension method.

THE DIENE RUBBER

The polymerized diene rubber latex used in accordance with this invention may be, for example, a latex of a synthetic rubber prepared by the polymerization of monomers such as butadiene and/or isoprene with or without the addition of up to 40% by weight of acrylonitrile, methacrylonitrile, styrene, methyl styrene, alpha methyl styrene and the like. Suitable cross-linking monomers, such as, for example, divinyl benzene and the like may be incorporated therein.

The polymerized diene rubber is emulsified in water with the aid of micelle-forming emulsifying agents. Fatty acid soaps prepared from lauric, myristic, palmitic, oleic, as well as sodium disproportioned resinates, are typical of emulsifying agents suitable for this purpose. The polymerization mixture contains a suitable water soluble free radical-generating catalyst such as a peroxide, or a persulfate. In addition, a modifier or regulator, such as a mercaptan, may be present in small amounts. The modifier acts as a chain transfer agent and limits the growth of the polymer chains. Polymerization is carried out under suitable conditions such as, for example, from about 0° C. to about 100° C., and autogenous pressure until a substantial portion (preferably in excess of 80%) of the conjugated diolefin is polymerized. The unreacted conjugated diolefin may be stripped off from the latex prior to the graft polymerization step.

PREPARATION OF THE HIGH RUBBER GRAFT POLYMER LATEX

The high rubber graft polymer latex is prepared by mixing styrene and acrylonitrile monomers with the polymerized diene rubber and polymerizing the mixture in the presence of the catalyst originally supplied in the preparation of the latex. Optionally, additional catalyst--of the same type used to polymerize the conjugated diolefin--may be added to complete the polymerization reaction.

In the preparation of the high rubber graft polymer latex of this invention, the styrene may be replaced, in part or entirely, by alpha methyl styrene, vinyl toluenes, alpha methyl vinyl toluenes and the like, including mixtures of two or more such hydrocarbons. Also, the acrylonitrile may be replaced, in part or entirely, with other alkenyl cyanides such as methacrylonitrile and ethacrylonitrile, or with alkyl acrylates such as methyl methacrylate.

The polymer-monomer portion of the reaction mixture for the high rubber graft copolymer components may vary between 20 and 50 parts by weight combined acrylonitrile plus styrene and about 80 to 50 parts by weight (dry basis) of diene rubber. The acrylonitrile preferably comprises from 5 to 90 parts by weight of the two component organic mixture (acrylonitrile-styrene), the styrene 95 to 10 parts by weight and the butadiene, correspondingly, 50 to 80 parts by weight.

The preferred polymerized diene rubber component of the graft copolymer is a butadiene-1,3 homopolymer latex having a solids content of 40% and containing 3 parts of potassium oleate per 100 parts butadiene-1,3. It was prepared in conventional manner by polymerizing the butadiene at about 65° C. in the presence of 0.25 parts potassium persulfate and 0.15 parts of dodecyl mercaptan chain transfer agent. The average particle size of the polybutadiene latex was 3000 Angstroms.

EXAMPLE 1

The high rubber graft copolymer latex was prepared by charging the following ingredients in a pressure tight reactor which was maintained at a temperature of 65°–85° C. for 2 hours, at which time the reaction was essentially complete:

| Ingredients | Parts by Weight |
|---|---|
| Polybutadiene Latex (Average Particle Size - 3000 Angstroms) | 75.0 |
| Acrylonitrile | 7.0 |
| Styrene | 19.0 |
| Cumene hydroperoxide | 0.35 |
| Sodium salt of hydrogenated. disproportionated resin | 0.25 |
| Sodium pyrophosphate | 0.04 |
| Sodium hydroxide | 0.05 |
| Dextrose | 1.0 |
| Ferrous sulfate | 0.002 |
| Mixed tertiary mercaptan (60:20:20 $C_{12}$:$C_{14}$:$C_{16}$) | 0.20 |
| Water | 38.50 |

THE SUSPENDING AGENTS

Inorganic suspending agents for use in the present invention comprise calcium phosphate, calcium carbonate, barium carbonate, talc, and the like. Organic suspending agents which can be utilized include polyvinyl alcohol, polyvinyl pyrrolidone, polyvinyl ether, and the like.

THE SUSPENSION POLYMERIZATION

EXAMPLE 2

The following ingredients were charged to a heated, stirred reactor:

| Ingredients | Parts by Weight |
|---|---|
| $Na_3PO_4 . 12H_2O$ | 3.16 |
| $CaCl_2$ anhydrous | 1.94 |
| Alkylaryl sulfonate surfactant (as a 0.1% solution) | 11.5 |
| $H_2O$ | 239.9 |
| $CaCl_2$ solution (3 Molar) | 3.43 |
| Graft Polymer Latex (Example 1) | 23.82 |
| Styrene | 56.76 |
| Acrylonitrile | 19.80 |
| Benzoyl peroxide | 0.5 |
| t-butyl perbenzoate | 0.1 |
| Mercaptan (t-ddm) | 0.2 |

The graft polymer latex emulsion was dripped slowly into the suspension solution comprising the water, sodium phosphate, anhydrous calcium chloride, the calcium chloride solution, and the alkylaryl sulfonate surfactant. The calcium chloride caused the emulsion to coagulate and a slurry of the graft material was formed in the reactor. The styrene and acrylonitrile are added slowly as a mixture, said mixture containing the mercaptan and initiators. A suspension was produced, and this suspension was polymerized in the stirred reactor for 12 hours at 75° C. The suspension product, which was a bead-like particle, was filtered, washed and dried.

EXAMPLE 3

The following example further illustrates bead-like particles prepared by the use of an inorganic suspending agent utilizing lauroyl peroxide in place of benzoyl peroxide. The following ingredients were charged to a heated, stirred reactor:

| Ingredients | Parts by Weight |
|---|---|
| $Na_3PO_4 . 12H_2O$ | 3.16 |
| $CaCl_2$ anhydrous | 1.94 |
| Alkylaryl sulfonate surfactant. | 0.01150 |
| $H_2O$ | 239.9 |
| $CaCl_2$ solution (3 Molar) | 3.43 |
| Graft Polymer Latex (Example 1) | 23.82 |
| Styrene | 56.76 |
| Acrylonitrile | 19.80 |
| Lauroyl peroxide | 0.5 |
| t-butyl perbenzoate | 0.1 |
| Mercaptan (t-ddm) | 0.2 |

The graft polymer latex emulsion was dripped slowly into the suspension solution comprising the water, sodium phosphate, anhydrous calcium chloride, the calcium chloride solution, and the alkylaryl sulfonate. The calcium chloride caused the emulsion to coagulate and a slurry of the graft material was formed in the reactor. The styrene and acrylonitrile are added slowly as a mixture which contained the mercaptan and initiators. A suspension was produced, and this suspension was polymerized in a stirred reactor for 12 hours at 75° C. The suspension product which was a bead-like particle was filtered, washed and dried.

The ABS polymers prepared in accordance with Examples 2 and 3 were compression molded into plaques and tested physically for property data. The physical properties are shown in Table I below:

TABLE I

| Example | 2 | 3 |
|---|---|---|
| Tensile Modulus p.s.i. | $2.9 \times 10^5$ | $2.8 \times 10^5$ |
| Tensile Strength p.s.i. | 5800 | 5025 |
| Flexural Modulus p.s.i. | $3.2 \times 10^5$ | $2.9 \times 10^5$ |
| Flexural Strength p.s.i. | 10,100 | 8650 |
| Izod Impact Strength ft./lb./in. notch 1/8" | | |
| 73° F | 6.3 | 5.2 |
| −40° F | 2.0 | 2.4 |
| Hardness (Rockwell) | 103 | 100 |

EXAMPLE 4

This example illustrates another inorganic suspension system but with a deviation in polymerization conditions to form the bead-like particles.

| Ingredients | Parts by Weight |
|---|---|
| SOLUTION 1 | |
| Water | 130.00 |
| $CaCl_2$ (anhydrous) | .48 |
| SOLUTION 2 | |
| Graft Polymer Latex (Example 1) | 26.7 |
| SOLUTION 3 | |
| Water | 50.00 |
| $Na_3PO_4 . 12H_2O$ | 1.93 |
| $CaCl_2$(anhydrous) | 1.09 |
| SOLUTION 4 | |
| Styrene | 55.00 |
| Acrylonitrile | 18.30 |
| Alkylaryl sulfonate surfactant | .01 |
| Benzoyl peroxide | .5 |
| t-butyl perbenzoate | .1 |
| Mercaptan (t-ddm) | .2 |
| Trisnonylphenyl Phosphite | .41 |

Solution 1 was added to a stirred reactor heated to 72° C. The graft polymer latex (Solution 2) was dripped slowly (1 lb./min.) into Solution 1. When the latex addition was complete, Solution 3 was added while maintaining the temperature of the reactor at 72° C. for 45 minutes at which time the emulsion had been completely broken and the pre-suspension formed. Solution 4 was then added at a rate of 2 lb./min. After the addition of Solution 4 was complete the reaction was carried out another 3 hours, the last hour at 120° C. The suspension product, which was in the form of bead-like particles, was filtered, washed and dried.

EXAMPLE 5

This example illustrates prior coagulation with calcium chloride and then suspension polymerization in the presence of an organic suspending agent.

| Ingredients | Parts by Weight |
|---|---|
| Polyvinyl alcohol | .7 |
| SOLUTION 1 | |
| Water | 180.0 |
| $CaCl_2$ (anhydrous) | .4 |
| SOLUTION 2 | |
| Graft Polymer Latex (Example 1) | 26.7 |
| SOLUTION 3 | |
| Styrene | 55.00 |
| Acrylonitrile | 18.30 |
| Benzoyl peroxide | .5 |
| t-butyl perbenzoate | .1 |
| Mercaptan (t-ddm) | .2 |
| Trisnonylphenyl Phosphite | .41 |

Solution 1 was added to a stirred reactor heated to 72° C. The graft polymer latex (Solution 2) was dripped slowly (1 lb./min.) into Solution 1. When the latex addition was complete, the emulsion was completely broken. The polyvinyl alcohol was added to the reactor. After 45 minutes, Solution 3 was added at a rate of 2 lb/min. After the addition of Solution 3 was complete the reaction was carried out another 4 hours, the last hour at 120° C. The suspension product, which was in the form of bead-like particles, was filtered, washed and dried.

In the preparation of the graft polymer of Examples 2–5 inclusive, the styrene may be replaced, in part or entirely, by alpha methyl styrene, vinyl toluenes, alpha methyl vinyl toluenes and the like, including mixtures of two or more such hydrocarbons. Also, the acrylonitrile may be replaced, in part or entirely, with other alkenyl cyanides such as methacrylonitrile and ethacrylonitrile, or with alkyl acrylates such as methyl methacrylate.

The diene rubber component of the final ABS polymer as prepared in Examples 2-5 inclusive should be in the range of 5 to 50 parts by weight; the ratio of styrene to acrylonitrile should be from about 10 parts by weight to about 90 parts by weight of styrene and correspondingly from about 90 parts to about 10 parts by weight acrylonitrile.

It has been found that when operating in accordance with the present invention, bead-like particles of a size from 140 to 10 mesh can be found. A bead size in the range of 140 to 35 mesh is preferred.

While this invention has been described in connection with certain specific details and examples thereof, these details and examples are illustrative only and are not to be considered limitations on the spirit or scope of said invention except insofar as these may be incorporated in the appended claims.

I claim:

1. A method of preparing an ABS polymer which comprises (1) polymerizing a vinyl aromatic hydrocarbon and an alkenyl cyanide in the presence of a diene rubber present in the form of an aqueous emulsion to form a graft ABS polymer emulsion latex; (2) completely coagulating the graft ABS polymer emulsion latex with a coagulant to form a slurry; (3) adding a vinyl aromatic hydrocarbon, an alkenyl cyanide and a suspending agent to said slurry; (4) heating said slurry to polymerize said added vinyl aromatic hydrocarbon and alkenyl cyanide in the presence of said graft ABS polymer; and (5) recovering the thus produced ABS polymer in bead-like form.

2. A method in accordance with claim 1 wherein the vinyl aromatic hydrocarbon and the alkenyl cyanide of Steps 1 and 3 are styrene and acrylonitrile, respectively.

3. A method in accordance with claim 1 wherein the suspending agent is calcium phosphate.

4. A method in accordance with claim 1 wherein calcium chloride is the coagulant and calcium phosphate is the suspending agent.

5. A method in accordance with claim 1 wherein calcium chloride is the coagulant and polyvinyl alcohol is the suspending agent.

6. A method in accordance with claim 1 wherein the diene rubber of Step 1 is polybutadiene.

7. A method in accordance with claim 1 wherein the diene rubber is a copolymer of butadiene and styrene.

8. A method in accordance with claim 1 wherein the diene rubber is a copolymer of butadiene and acrylonitrile.

9. A method in accordance with claim 1 wherein the vinyl aromatic hydrocarbonand the alkenyl cyanide of Steps 1 and 3 are styrene and acrylonitrile, respectively, the diene rubber of Step 1 is polybutadiene, the coagulant of Step 2 is calcium chloride and the suspending agent of Step 3 is calcium phosphate.

* * * * *